United States Patent [19]

Kesseru

[11] Patent Number: 5,112,081

[45] Date of Patent: May 12, 1992

[54] CAR PROTECTIVE DEVICE FOR PASSENGERS

[76] Inventor: Julius Kesseru, 1410 Morrow Rd., Pittsburgh, Pa. 15241

[21] Appl. No.: 716,388

[22] Filed: Jun. 17, 1991

Related U.S. Application Data

[63] Continuation-in-part of Ser. No. 468,213, Feb. 20, 1990, abandoned.

[51] Int. Cl.⁵ .............................................. B60R 21/06
[52] U.S. Cl. ...................................... 280/749; 296/96
[58] Field of Search ...................... 280/748, 749, 753; 296/95.1, 96

[56] References Cited

U.S. PATENT DOCUMENTS

| | | | |
|---|---|---|---|
| 1,186,865 | 6/1916 | Uttz | 280/749 |
| 1,256,848 | 2/1918 | Uttz | 280/749 |
| 2,592,573 | 4/1952 | Joncas | 280/749 |
| 3,650,542 | 3/1972 | Shimano et al. | 280/749 |
| 3,804,430 | 4/1974 | Fiala | 280/749 |
| 4,906,020 | 3/1990 | Haberer | 280/749 |

Primary Examiner—Kenneth R. Rice

[57] ABSTRACT

At head on collision a switch at length of the front bumper activates two electromagnets pulling retaining pin, from the steel framed nylon sheet on the car ceiling, hinged over the windshield frame with the help of two springs brings it down in between the occupant and the windshield, but holding back in perpendicular position by two nylon ribbons, the device preventing with its strength and resilience the occupants head from windshield head injuries. Presently used seat belt can be still used, though optionally the seat belt can be altered a way, avoiding the present seat belt caused injuries.

4 Claims, 5 Drawing Sheets

CAR PROTECTIVE DEVICE FOR PASSENGERS

CROSS REFERENCES TO RELATED APPLICATIONS

This application is a continuation in part of Ser. No. 07/468213 filed on Feb. 20, 1990, now abandoned.

BACKGROUND OF THE INVENTION

From 1916 up-to-date are several inventions aiming to prevent the head and torso to hit the windshield, steering wheel, dashboard, etc., at collision. Since lately the cars are made with collapsible steering wheel shaft, this problem is lessened. Since I myself am not an engineer but a retired surgeon, I see this problem from different viewpoints. Observing skull fractures, abdominal internal deadly injuries, I searched what are those caused by. All of the devices having short comings besides benefits. In many of the quoted inventions, at times the material strength, resilience, speediness and proper anchoring is only vaguely mentioned, like "leather, woven material, net, etc.". I was spending quite alot of time in selecting the proper material and the proper mounting possibilities, and to make it simple. Some of the inventions described before me, cost more practically than a used car, and so complicated that at times I was thinking, this is only in blue print, and no prototype exists at all. As myself, I did not make any blueprint, but tried different materials and the way of applications, with "hit and miss and try again" method. Finally the prototype is in my car mounted and is working well, and so simple, that I made it in my own garage, buying parts in local stores, for minimal amount of money. I describe—with drawing, but it could be altered by manyfacturers, for instance, using tempered steel or using different switches, but I still describe mine as it is and giving reasons why is what. But first, I want to pinpoint the disadvantages of the former, or presently used methods.

The air bag, or different interpositions having at least one common disadvantage, namely, at collision, the air bag, material, screen, net, etc., in order to protect the occupant from hitting the windshield, racing against the occupants head from the opposite direction. That makes an impact itself. For instance, the air bag cannot even be tested, for tear or wear, or it is a puzzle that the pressure bottle will work or not, due to leakage, etc. The air bag can malfunction even without collision, inflates when the car is in high speed, obstructing the sight—and causes accident itself. It is a major and expensive repair to reinstall the device.

To my invention Fiala's idea, U.S. Pat. No. 3,804,432, is the closest, in his description, vaguely mentioning about ten or seventeen valves, cylinders, feelers, complicated oil tubing. Those are evidently custom made. More accessories, more potential malfunctions. The head protector is not even determined where to anchor or how to frame it. If you are using it for head, torso and leg, his clamp down device in the most critical moments you are unable to use properly the throttle or brakes due to the restraint. It activates through oil tubing. The oil pressure speed is about the speed of the sound, but the electric trigger will fire with the speed of light in my simple combination.

My head protective device can be used with the presently used seat belt, but because so many injuries are caused by the narrowness and rigidity of the seat belt, that is why I recommend some improvement of the seat belt. Since I gave up the second framed nylon sheet in my first registered application, as for exchange, I would recommend the modified seat belt instead.

The present seat belt injuries are, exploding bowels, kidney, spleen ruptures, collar bone fracture, serious neck injuries, at times fatal. In one case in Pittsburgh, a car was rolling over, and the driver's neck was entangled with the seat belt, and hung him. The insurance company tried unsuccessfully to prove that it was a suicide.

My recommendation is small, but essential modification would be as follows:

As a physician I know if the seat belt would be wide—eight (8) inches, as commonly used as abdominal support, or rib belt, and would be made from the same elastic (maybe doubled) material then it would not cause the above described seat belt injuries.

The elastic seat belt material should be retracted by the presently used roller system, with the difference that it should be in perpendicular position, affixed to the car frame, next to the seat, and by railing could be raised and lowered to the desired height. The roller should be stopped with a fixed stopper, when the desired length is reached and then buckled in with the same buckle as in use now.

Since with the "Roller Stopper" you can have the seat belt comfortably loose—one (1) to two (2) inches away from the abdomen, it would not interfere with the driving, but still would give maximal protection.

SUMMARY OF THE INVENTION

An upside down U shaped steel bar is hinged and fastened above the windshield to the frame at length of the windshield. The two arm ends of the U shaped bar is in wound up position is held up to the car ceiling, by the way of two inserted pin locks, fastened above the doors to the car frame, fitting in the steel bar ends couplings. Around the two stems of the U bar a completely transparent 1/16th inches thick and 8 inches wide nylon flexible sheet is wrapped around snugly, and the ends are glued together, in the middle or on the side with strong adhesive nylon glue in the width about 2½ inches. At headon collision or impact since on the front bumper is a bumper long switch, it will close the electric circuit. It will activate the two electric magnets located and fastened behind the locking pins pulling out the pins from the couplings. Two springs (ordinary screen door springs) are pulling down the framed nylon sheet in a perpendicular position, withholding in this position by two nylon ribbons, with one end tied to the coupling end of the bars, and the other ends of the nylon ribbons are fastened under the firing pins. The two springs lower end are anchored in the windshield frame—dashboard corner, the upper ends, to the U frame arms about two (2) inches far from the horizontal part of the U frame. This process happens with the speed of electricity, and the speed of the semiautomatic rifle recoil.

Important fact, and difference from the former inventions, that the device is not racing against the occupants head from the opposition direction, punching, slapping in the face, but moving with the occupants head, but passing it by the help of the springs and slowing down gently the occupants head. The internationally accepted standard for the strength of the windshield from inside is to withstand five pounds dropped from 12 feet height. My framed nylon sheet is tested, and was superceding this strength many times, and was gently resilient, due to the elastically of the nylon sheet, and spring affect of the frame itself, completely protecting the head from windshield injuries.

DESCRIPTION OF THE PREFERRED EMBODIMENTS

Figure 1:
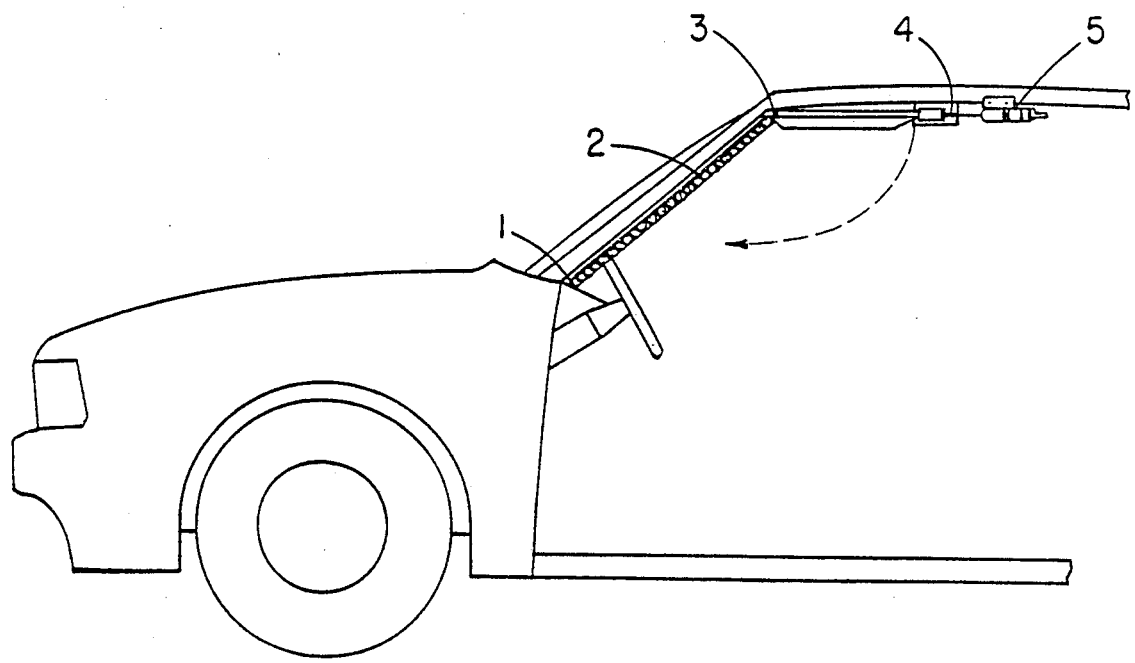
FIG. 1 shows the initial position of the device.
Figure 2:
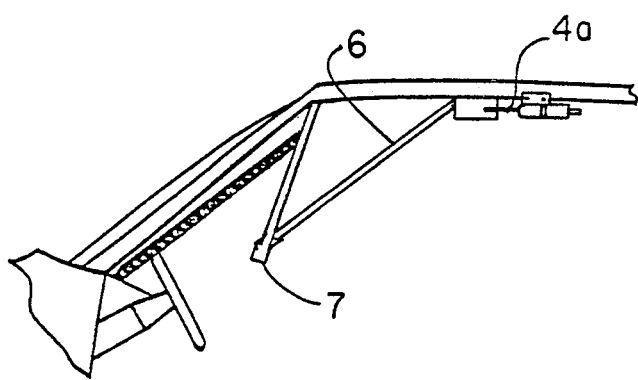
FIG. 2 shows when the device has been activated.
Figure 3:
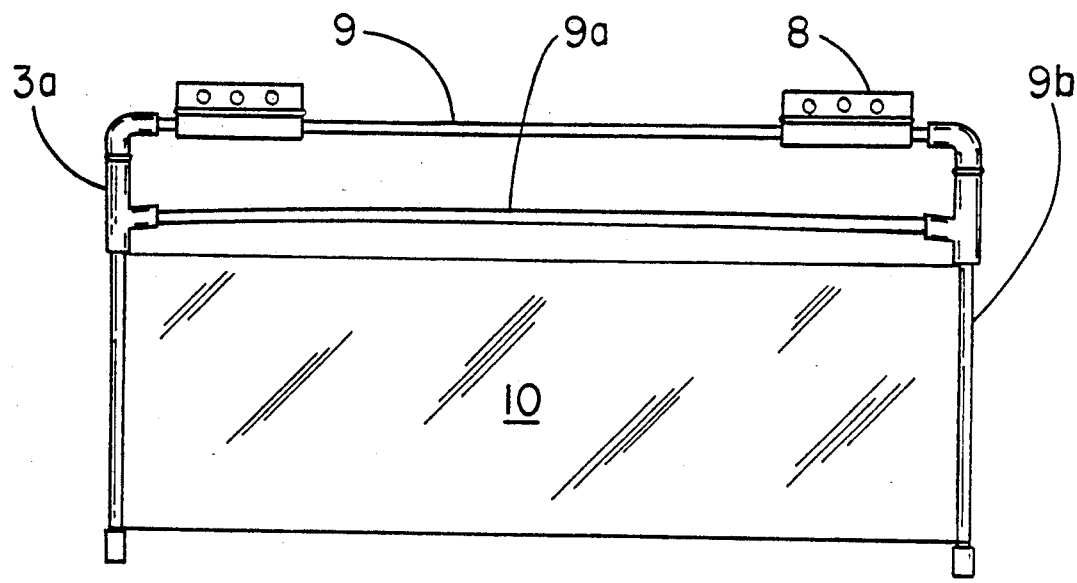
FIG. 3 shows the second view when it has been activated.
Figure 4:
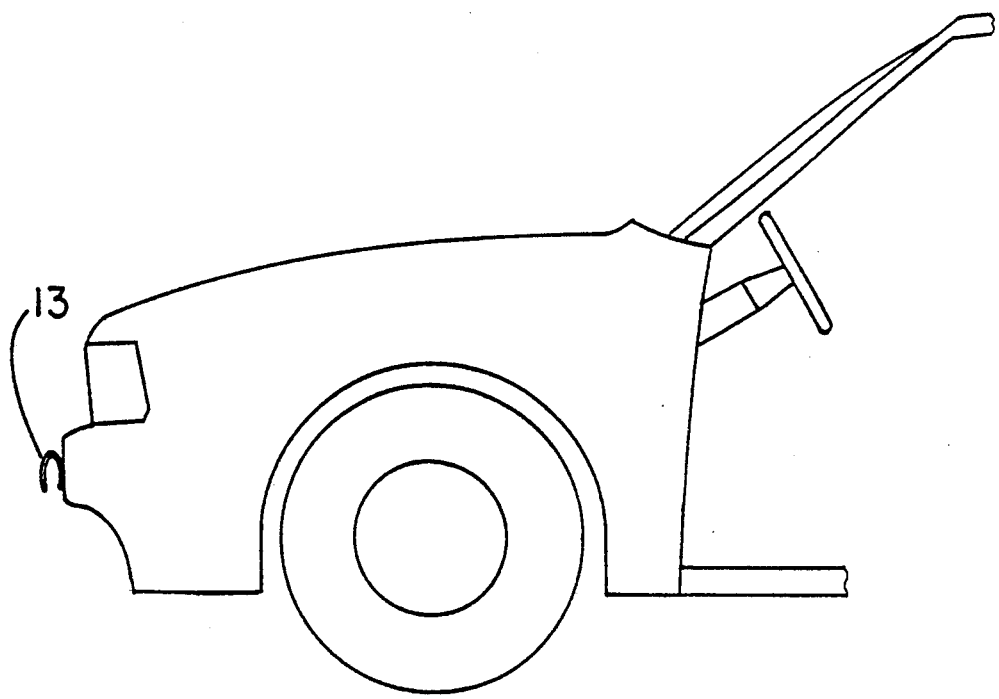
FIG. 4 shows the bumper trigger device.
Figure 5:
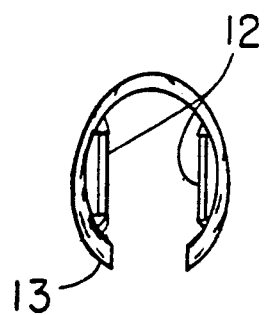
FIG. 5 shows the cross section of the switch in the tube.
Figure 6:
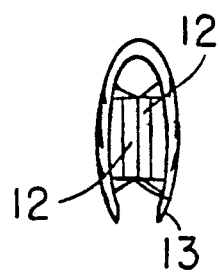
FIG. 6 shows the same in an activated position.

The material has been used for U frame ⅜" solid rod is feasible, but if it is not tempered—like mine—then at the two corners ¼" pipe elbow are used. Advantageous, because of rigid strength, and by screwing in the tapped rod, some length adjustment can be made. One-eighth inch pipe T tapped through is used under it, in which the cross supporting bar can be screwed in, as well as the side parts of the U frame bar. Sheet (3), FIG. (8) demonstrates the spring like action of the supporting bar. Three eighth inch (⅜") bolt coupling is used for the pin-bar connection. PVC Door Strip—OBOXIN—8" wide and 1/16th" thick double wrapped nylon sheet is used, due to its strength, clear transparentness and resilience, 3M4475 SHELF LIFE adhesive was used to glue the sheets together. FIG. 1 shows the device is in a cocked up position. 1 shows that the spring 2 is anchored to the dashboard corner 1 and to the U frame perpendicular arm, right below the supporting bar FIG. 1 3/3a. FIG. 1. 4. shows the firing pin, in the U bar coupling and 5. shows the electromagnet fastened to the roof side above the car door, which at bumper contact FIG. 4.13 and FIG. 6 is visualized. FIG. 2 the device is in an activated position. 6. is the retaining nylon ribbon attached by one end to the roof angle and to the perpendicular end 7 of the steel bar 9b. On FIG. 3 shows that the U frame is enforced with a parallel steel bar 9a, about 2 inches apart from the U bar 9. The U bar is anchored with two (2) hinges 8, to the windshield frame.

Figure 7:
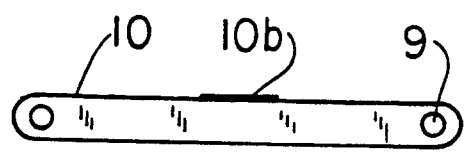
FIG. 7 shows the cross section of the protective sheet.
Figure 8:
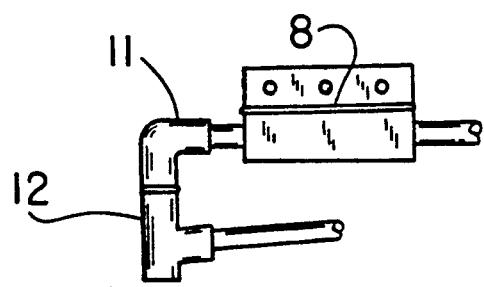
FIG. 8 shows the anchoring of the frame.
Figure 9:
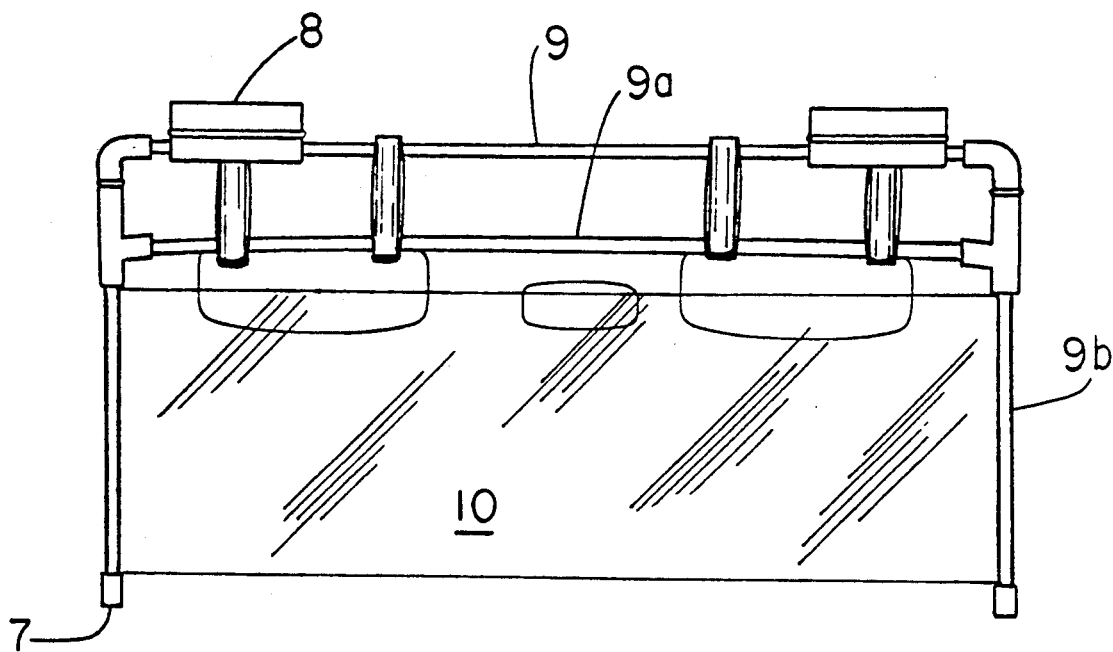
FIG. 9 shows the view of the device from the front seat.
Figure 10:
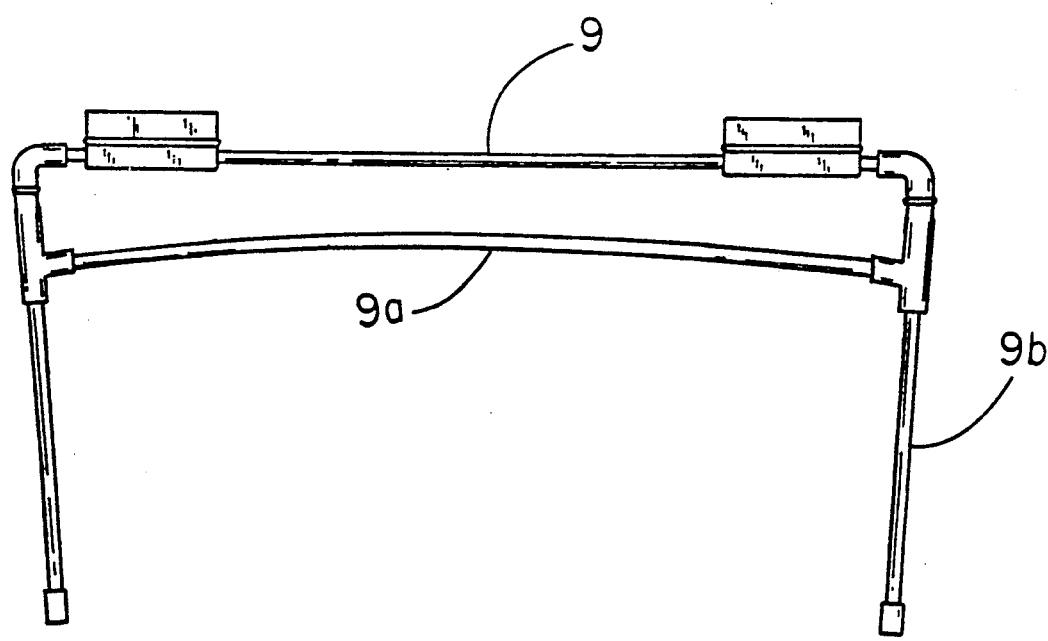
FIG. 10 shows the frame enforcement curves upon impact.
Figure 11A:
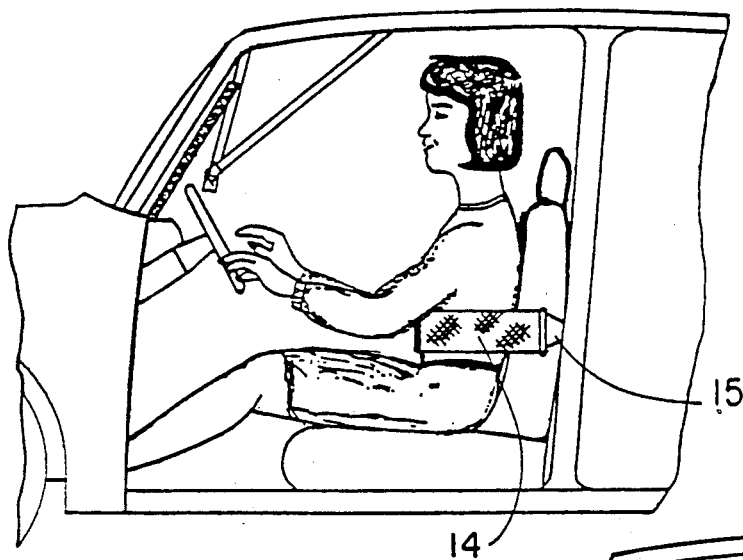
FIG. 11a shows an optional elastic seat belt applied and shows the driver.
Figure 11B:
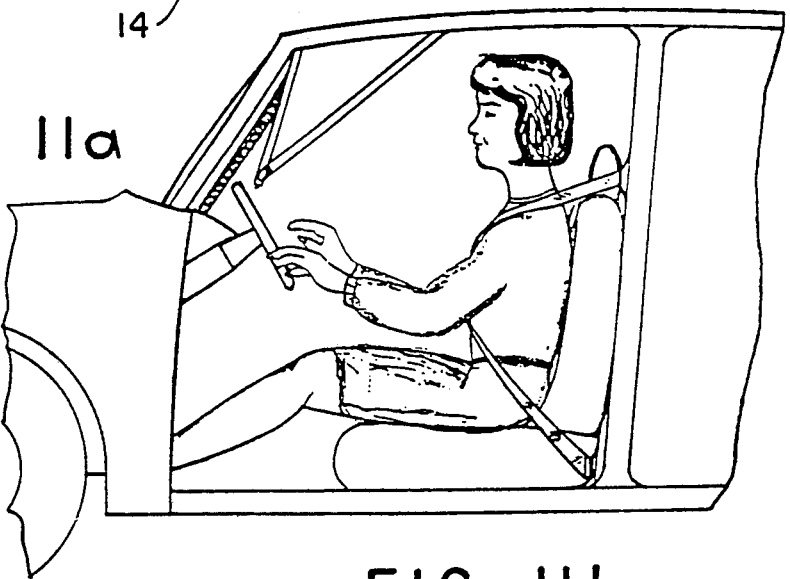
FIG. 11b shows the same with the regular seat belt.
Figure 12:
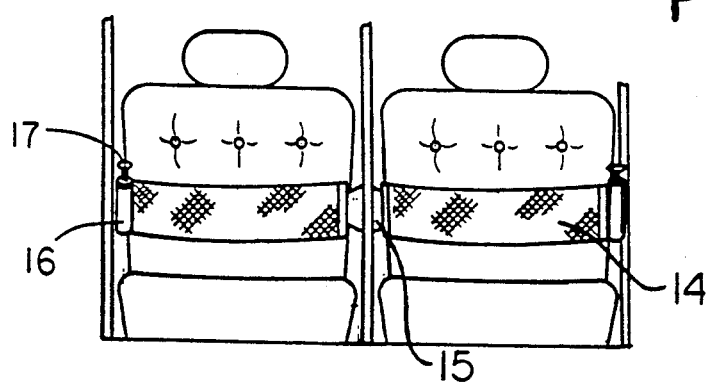
FIG. 12 shows the elastic seat belt with rachet and releasable buckle.

FIG. 7 shows the cross section of the double folded nylon transparent sheet 10, glued together 10b, and (strained) around the U frame 9. FIG. 8, 11, 12 demonstrates the hinge, the L and T pipe connectors, creating the double enforced U bar on FIG. 9 from the occupants view. It shows that the U bar in an activated position with the nylon sheet, but its transparentcy is demonstrated also by the fact that the sun visor and the mirror can still be visualized through the sheet. On FIG. 10 it demonstrates that by head impact against the nylon sheet, the parallel enforcement cross bar will bend as a spring 9a. FIG. 11 shows the device in an activated position with the elastic seat belt, or with the regular seat belt 11b. FIG. 12, the rachet 16, the rachet stopper 17, the elastic wide seat belt 14 and the releasable buckle 15 is demonstrated by face view.

I claim:

1. The occupant protective device for passenger and driver comprising of a nylon sheet attached to a U shaped steel frame, said frame being pivotally attached above and along the windshield and releasable attached to a trigger means, said trigger means being attached to a sensor, springs means attached to the U frame and anchored to the dashboard corners, retaining means attached to the U frame and to the roof, said sensor activates the trigger upon collision, to release the U frame from the car roof, allowing said spring means to pull the nylon covered U frame forward to a position between the occupants and the windshield, said retaining means preventing the said frame from hitting the windshield and the occupants' heads are unable to hit the windshield, only the elastic nylon sheet.

2. The device described in claim 1 wherein said sensor is an impact activated switch mounted on the front bumper on the vehicle.

3. The device described in claim 2, wherein said switch comprises of a pair of electrical contacts mounted inside of a rubber hose, which extends the width of the front bumper.

4. The device disclosed in claim 1 further comprising of a wide elastic seat belt, mounted on a ratchet wheel attached to one side of the seat and on the other side to a releasable buckle.

* * * * *